(12) United States Patent
Komerath (10) Patent No.: US 10,775,586 B2
(45) Date of Patent: Sep. 15, 2020

(54) GLITTER BELT: ATMOSPHERIC REFLECTORS TO REDUCE SOLAR IRRADIANCE

(71) Applicant: Narayanan Menon Komerath, Alpharetta, GA (US)

(72) Inventor: Narayanan Menon Komerath, Alpharetta, GA (US)

( * ) Notice: Subject to any disclaimer, the term of this patent is extended or adjusted under 35 U.S.C. 154(b) by 90 days.

(21) Appl. No.: 16/140,161

(22) Filed: Sep. 24, 2018

(65) Prior Publication Data

US 2020/0096731 A1   Mar. 26, 2020

(51) Int. Cl.
| | | |
|---|---|---|
| A01G 15/00 | (2006.01) |
| G02B 7/182 | (2006.01) |
| B64C 39/10 | (2006.01) |
| B64C 39/02 | (2006.01) |
| B64B 1/58 | (2006.01) |
| B64D 27/24 | (2006.01) |
| B64C 27/08 | (2006.01) |
| B64B 1/44 | (2006.01) |
| B64F 1/10 | (2006.01) |

(52) U.S. Cl.
CPC ............ *G02B 7/182* (2013.01); *A01G 15/00* (2013.01); *B64B 1/44* (2013.01); *B64B 1/58* (2013.01); *B64C 27/08* (2013.01); *B64C 39/02* (2013.01); *B64C 39/10* (2013.01); *B64D 27/24* (2013.01); *B64F 1/10* (2013.01)

(58) Field of Classification Search
CPC ........... A01G 15/00; B64G 1/58; B64C 39/10
See application file for complete search history.

(56) References Cited

U.S. PATENT DOCUMENTS

| | | | | |
|---|---|---|---|---|
| 5,762,298 A | * | 6/1998 | Chen ...................... | A01G 15/00 244/172.7 |
| 7,913,953 B2 | * | 3/2011 | Ellinghaus ............. | B64G 1/407 244/159.6 |
| 2008/0030884 A1 | * | 2/2008 | Hershkovitz .......... | A01G 15/00 359/871 |
| 2011/0013271 A1 | * | 1/2011 | Kawai .................... | A01G 15/00 359/350 |
| 2015/0230414 A1 | * | 8/2015 | Stelmack ................ | B64G 9/00 239/2.1 |
| 2016/0194096 A1 | * | 7/2016 | Bradley ................... | B64G 1/66 705/301 |

OTHER PUBLICATIONS

NASA Armstrong Fact Sheet: Helios Prototype, https://www.nasa.gov/centers/armstrong/news/FactSheets/FS-068-DFRC.html (Year: 2014).*

* cited by examiner

*Primary Examiner* — Charlie Y Peng (57) ABSTRACT

A method is described to reduce Global Warming by reflecting solar irradiance. Thin reflective sheets are flown under control in the upper atmosphere above Earth, in contrast to reflecting from Space orbits or the ground. The high altitude enables nearly total reflection. Two general embodiments use translational and/or rotational motion of the sheets to hold sheets stretched while providing aerodynamic lift, while a third uses buoyant aerostatic lift. During the daytime solar power is used. During the night the low wing loading of the sheets facilitates gliding flight without descending into controlled airspace. Sheets can be arrayed to increase aspect ratio and decrease induced drag. By following the summer sun, effectiveness is increased. A swarm of reflectors around the south Polar Circle can reduce summer melting of ice enough to reverse the rise in sea level.

1 Claim, 4 Drawing Sheets

GLITTER BELT: ATMOSPHERIC REFLECTORS TO REDUCE SOLAR IRRADIANCE

FIELD OF THE INVENTION

The primary field of application is to reduce Global Warming. The methods are related to air vehicles, both heavier and lighter than air.

BACKGROUND OF THE INVENTION

Anthropogenic climate change is one of the most difficult problems facing humanity. The release of heat and heat-absorbing Green House Gases (GHG) into the atmosphere is causing the temperature at the Earth's surface to rise. The Intergovernmental Panel on Climate Change (IPCC) (Reference [1]) reports that Earth's atmosphere is retaining heat at a net rate of radiant forcing of 2.29 Watts per square meter of the Earth's surface. Normalized to the disc area of Earth seen by the Sun, this gives 9.16 Watts per square meter. This is compared to the nominal value of 1350 Watts per square meter of solar energy, called Air Mass Zero or AM0, falling on Earth's atmosphere. The prescribed remedies are controversial because they detract from economic growth of nations or prevent the advancement of subsistence economies. Even if implemented, they will take a very long time. Island dwellers and people in low-lying coastal areas face rising sea levels because of the polar ice caps melting. Extreme weather events are already attributed to climate change.

PRIOR ART

One way to control Global Warming is to reflect a part of the sunlight back into Space. Such a remedy has been proposed by several methods in prior art. These include reflectors or bubbles in Space [2-3], reflective particles or balloons released along with industrial exhaust and other aerosols [4-8], extracting carbon dioxide ($CO_2$) from the atmosphere and ejecting purified air [9,10] and wind turbines pumping Antarctic sea-water to the ice-cap [11,12]. Ground-based tiltable reflectors have been proposed [13], and US national laboratory researchers have proposed increasing the albedo of urban areas by mandating white paint on roofs and sidewalks [14,15]. The above shows that the Prior Art consists of difficult methods that have proved to be impractical, harmful and ineffective. They are also not easily reversible once deployed, and their long-term effects cannot be predicted. The above also illustrate the extreme measures that have been proposed, implying huge expense and strong and varied concerns. None has to-date been adopted on a large scale.

SUMMARY OF THE INVENTION

Figure 1:
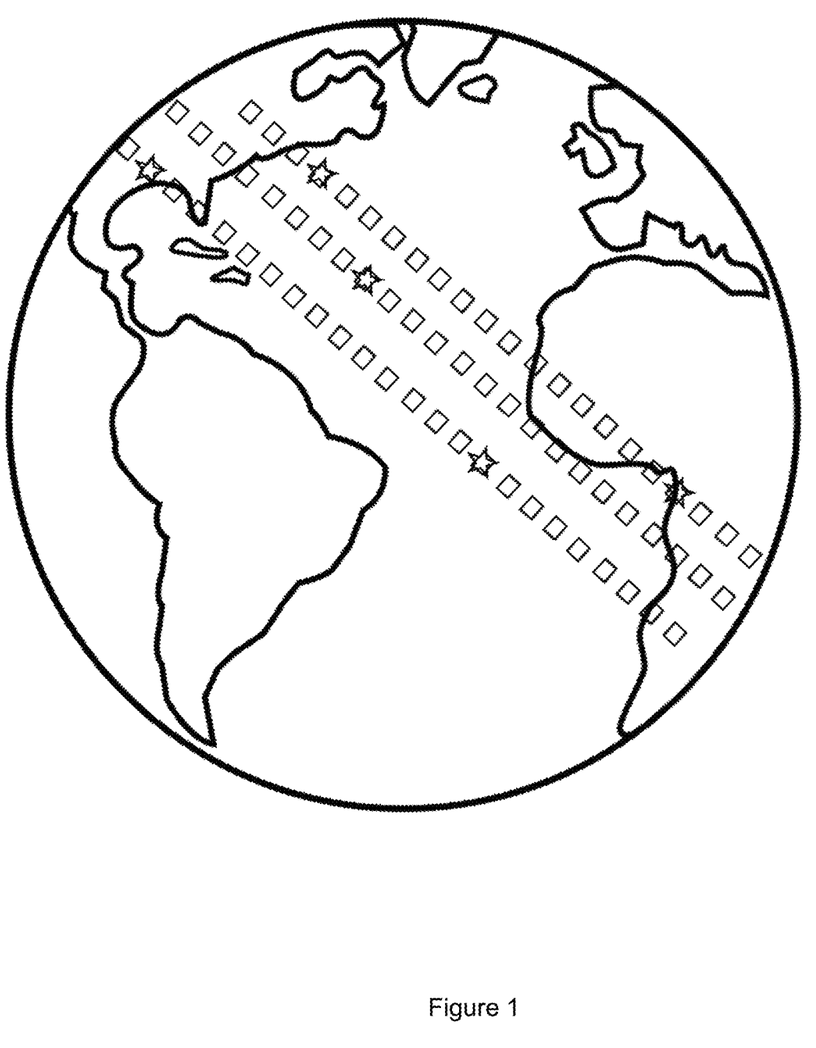
FIG. 1 shows an exaggerated illustration of the Glitter Belt concept. It shows an array of reflectors reflecting sunlight. Sizes of individual reflectors are highly exaggerated in the figure for clarity. In reality the individual sheets may not be visible except as points of light, from Space.

The solution advanced by the present invention, hereinafter called the Glitter Belt, is to float reflective sheets in the upper atmosphere, nominally at 30,480 m (100,000 ft), using means that ensure that they will not sink below 18,288 m (60,000 ft or Flight Level 600, the edge of controlled airspace) in the night time. The reflectors are anticipated to be made of thin sheets with low areal density. They will have highly reflective upper surfaces, and the option of flat black lower surfaces. The former is to reflect sunlight in the daytime. The latter is to absorb radiation from Earth at night, so that most of it will then be transmitted by conduction to the upper surface and radiated out into Space. The idea is shown in FIG. 1, the reflectors being highly exaggerated to make them visible to the reader. High-altitude reflectors are far more effective compared to ones on the ground, while being several orders of magnitude less expensive than Space-based reflectors as discussed later in this application. Simple consideration of optics shows that diffraction will prevent the reflectors from being seen from the ground.

Figure 2:
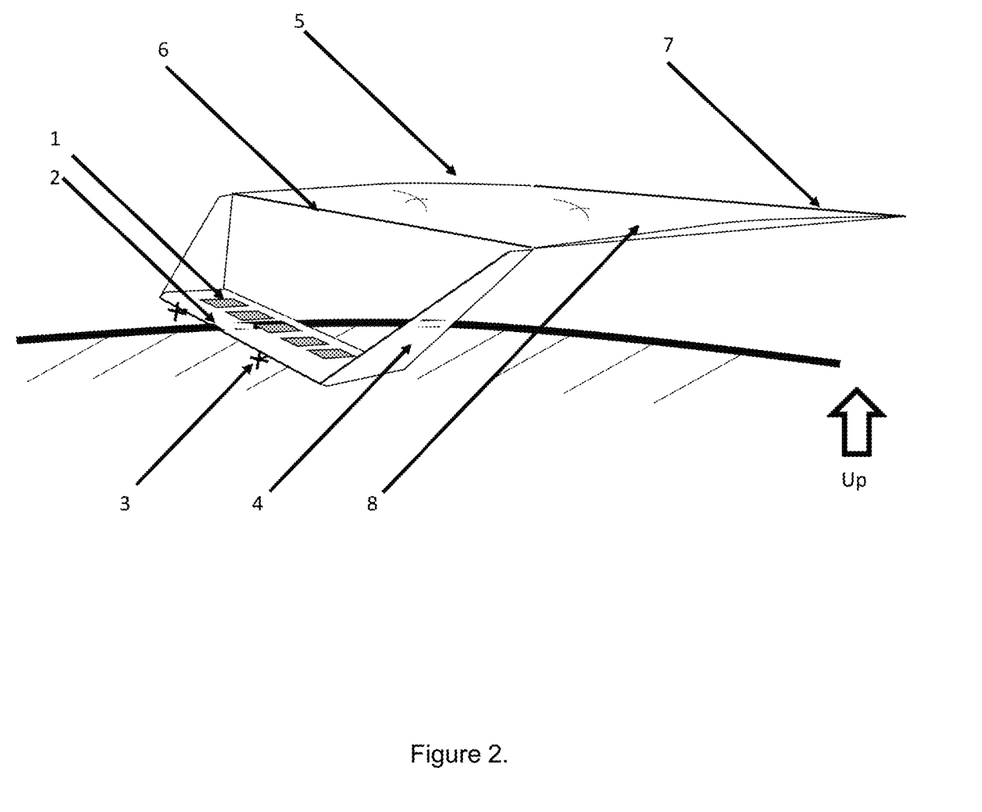
FIG. 2 illustrates the Flying Leaf concept, an aerodynamically supported reflector. The Earth's horizon is shown as a thick curved line.
Figure 3:
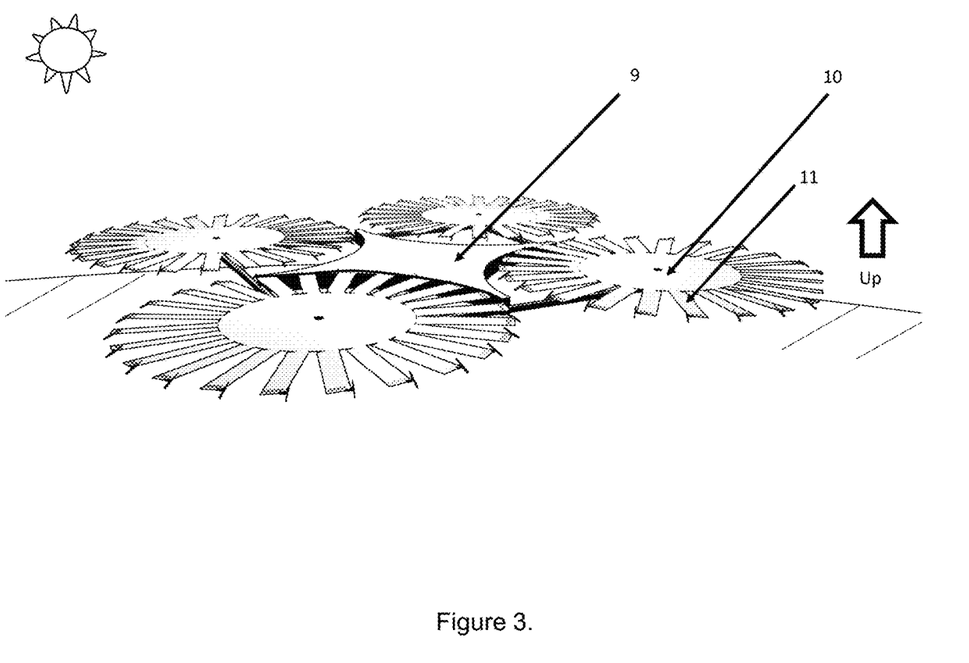
FIG. 3 illustrates one implementation of the Quadrotor Beanie concept, showing centrifugally stretched reflectors.
Figure 4:
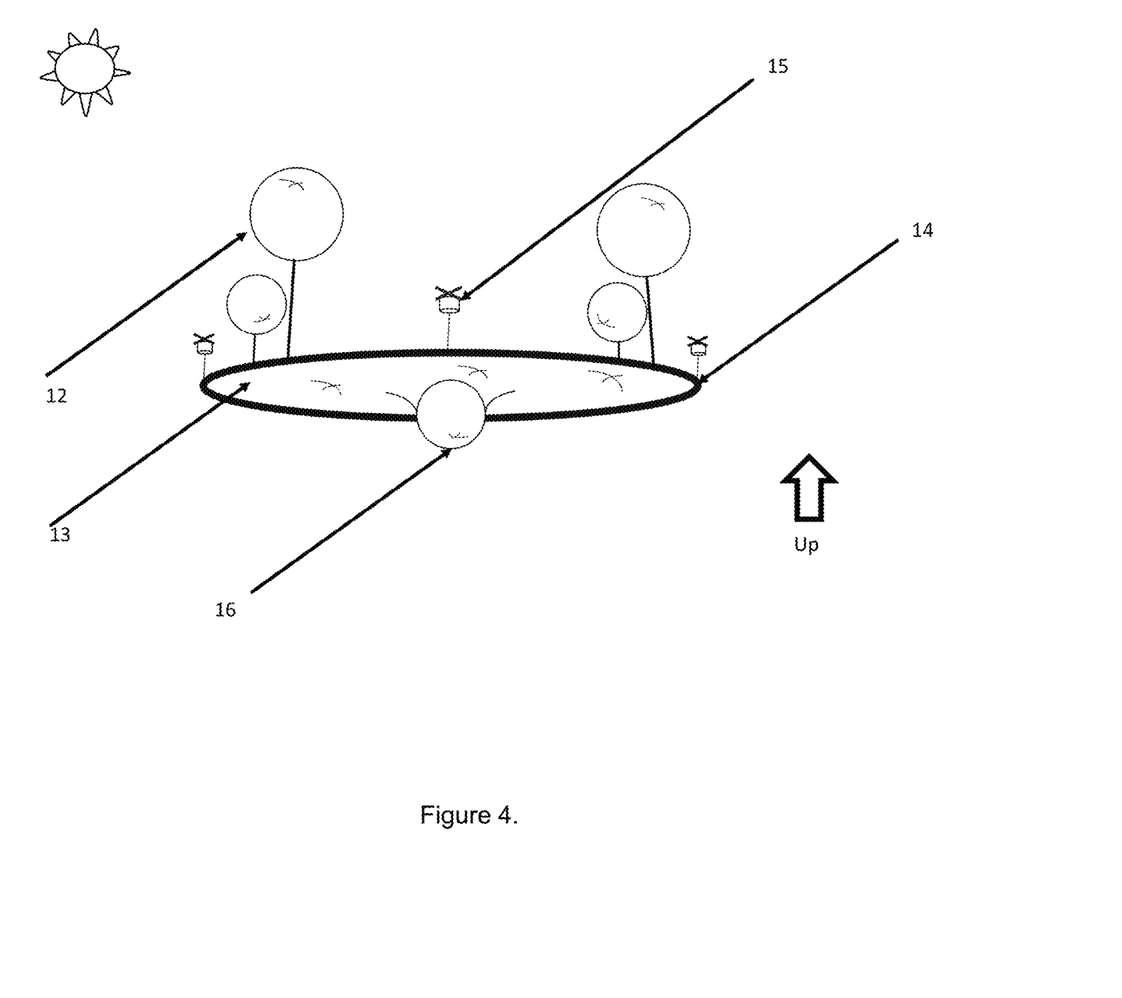
FIG. 4 illustrates one implementation of the Balloon Beanie concept. The reflective sheet is aerostatically supported by hydrogen balloons. In this implementation an inflated tube around the periphery provides tension to the sheet and supports solar-powered rotors to provide attitude control and enable station keeping and drift with the seasons. Framework if any is required, and solar panels, are not shown.

Three general implementations of the Glitter Belt are discussed as shown in FIGS. 2, 3 and 4. An architecture that is ultimately deployed, may use some combination of all or some of these implementations. FIG. 2 shows the "Flying Leaf": a reflective lifting sheet towed by a solar-powered aircraft. FIG. 3 shows the "Quadrotor Beanie", where four centrifugally stabilized reflector sheets with solar-powered rotors generate enough aerodynamic lift to stay in position. The third concept, the "Balloon Beanie" shown in FIG. 4, uses buoyancy or aerostatic lift. Hydrogen balloons support the reflector sheet, again with solar-powered rotors at the periphery providing control, transportation and station-keeping in wind when needed. An inflatable rim filled with hydrogen provides tension for the sheet.

BRIEF DESCRIPTION OF THE INVENTION

The Glitter Belt invention is to place ultra-light reflector sheets, not in orbit in Space, but at the edge of the atmosphere. Above 24 km (roughly 80,000 feet) altitude, the sky looks black from horizon to horizon even in bright sunlight. This is because there is not sufficient air to scatter the light and give the blue appearance seen below. With ultralight sheets, the aerodynamic loading (defined as the weight supported per unit area of aerodynamic lifting surface) is so low that the sheet can fly like a wing, given sufficient speed.

The sheets can be equipped with sufficient structure and means for automatic guidance, navigation and control, so that they can fly in autonomous mode with only minor supervision from ground-based controllers. Over most of the planet, wind speeds and weather variations are small at such altitudes.

The advantages of the Glitter Belt concept compared to the Space-based reflectors of prior art, are obvious. The average speed required for the aerodynamic flight concept (Flying Leaf) is well under 10 m/s (ten meters per second), compared to the minimum speed required for low-earth orbit, which is approximately 7500 m/s. Since kinetic energy is proportional to the square of speed, a Space-based reflector would require 562,500 times the kinetic energy per unit area of reflector as the Glitter Belt. While orbiting spacecraft above 300 km altitude require very little power to stay in orbit for a long time, vehicles in the atmosphere need power addition to counter drag. However, sunlight provides plentiful and inexhaustible energy to power such vehicles. Unlike Space vehicles which incur high launch costs, the Flying Leaf vehicles can be launched from the ground almost anywhere on a clear morning, to climb to the required altitude. They can also be repositioned easily by aerodynamic flight, compared to the high expenditure of energy required to change the orbital plane of a spacecraft. Low flight speed keeps the Flying Leaf vehicles localized over desired areas, posing much less risk to other traffic, than an equivalent number of vehicles moving at orbital speeds.

FIG. 1 exaggerates the sizes of individual reflectors to illustrate the concept, Reflectors in the preferred embodiment of the invention will probably be concentrated in selected bands rather than being uniformly spread over the globe. The bands are expected to follow the summer Sun and cross the Earth's Equator twice a year.

Reflective sheets of aluminized Mylar, as an example, reflect 95 to 99% of broadband sunlight. With the reflectors located at a nominal altitude near 30,480 meters (100,000 feet), almost all of the reflected radiation will exit permanently into Space. In comparison, a ground-based reflector will only send about 50% of solar radiation back into Space, with most of the remaining 50% being absorbed in the lower atmosphere.

Thus, high-altitude reflectors are roughly twice as effective per unit area as ground-based reflectors. They do not need landowners' permission and can float above the oceans and icecaps as well. They are not affected by cloud cover and receive direct sunlight for more hours per day than ground-based reflectors. The ability to drift with the seasons to stay under the summer sun makes them even more efficient than ground-based reflectors.

Aerodynamic Solar Reflector: Flying Leaf

In one embodiment of the invention, the basic element of the "Flying Leaf" reflector array is a reflective sheet towed by a solar-powered, distributed electric-propelled flying wing as shown in FIG. 2. Each sheet has a chord of 30 meters and a span of 60 meters. Upon reaching the required altitude, ten such sheets are expected to fly in formation and link up into a single wing of span 600 meters and chord 30 meters. This provides an aspect ratio of 20, reducing the lift-induced drag. The design point requires that night-time gliding descent must not come below 18,288 meters (60,000 feet or FL 600) density altitude, during the hottest and longest night. This is expected to be during the Equator crossings, where the longest night does not exceed 12 hours. Low sink rate requires a high lift to drag ratio and low flight speed. The latter requires low wing loading to avoid extreme lift coefficients. The NASA Pathfinder and Helios solar-powered aircraft had difficulty exceeding 96,000 feet, but both required energy storage on-board because their wing loading was far higher than that of the Flying Leaf. The Flying Leaf has an extremely low wing loading and thus achieves a very low speed for minimum drag. The 30 m chord was chosen because it is possible with current technology to maintain laminar flow up to a chord Reynolds number of 1 million, and thus achieve low values of the zero-lift drag.

Quadrotor-Beanie: Centrifugally Stretched Aerodynamic Reflector System

The second example implementation of a Glitter Belt element is a quad-rotor where each rotor consists of a slowly-spinning set of reflector blades at the edge of a large reflector-covered hub. This is shown in FIG. 3. Energy storage is by a combination of altitude and rotational inertia with the optional addition of tip-mounted batteries.

Aerostatically Supported High-Altitude Reflector

The third embodiment of the Glitter Belt element is to support a reflective sheet using a set of hydrogen balloons. This is shown in FIG. 4. A light, rigid structure will be required. The optimal form for the reflector sheet is probably a circle as shown in FIG. 4, stretched over an inflated ring or series of concentric inflated rings with radial supports. This concept avoids the need to provide continuous aerodynamic lift, and therefore breaks through the night-time glide issue. It also allows the sheet to be held tilted to large angles, in order to maximize reflection of sunlight even where the sun is quite low on the horizon. This is the case in summer over the Antarctic Circle.

The Polar Necklace

Some concepts are anticipated to improve the effectiveness of the first deployed systems. The most urgent visible symptom of Climate Change is the breakup of the Antarctic Ice Shelves [16]. These are large sheets of ice formed by the flow from glaciers coming off the higher elevations of Antarctica. Large portions of these ice sheets are floating on the ocean. As ocean temperature increases the balance shifts between summer-time melting and winter ice accumulation, the sheets get thinner. Fractures appear. Large chunks drop into the ocean and float away to warmer parts of the ocean, and melt. Their melting raises the mean sea level. Thus, the problem is not so much the heating of the Antarctic plateau, but the rise in the ocean temperature bordering Antarctica. By decreasing summer sunlight on the ocean at the coastline, the balance between summer melting and winter ice accumulation may be reduced enough to reverse the present trend. A circular array of reflectors located approximately over 67 degrees Latitude (the Antarctic Circle) in summer will assist in this process. In prior art, Kawai [13] has suggested ground-based reflectors at polar latitudes to assist this; however, installation costs and acceptability of such reflectors are not addressed. The present invention offers a scalable, automatic-controlled and remotely deployed solution that appears to be superior to installing ground based reflectors in Antarctica. The installation of a ring of such upper atmosphere reflector arrays around the polar circle is named the Polar Necklace. As the Antarctic summer ends, the reflectors can be drifted and redeployed to follow the summer Sun using the small solar-powered rotors.

Even in summer, the polar Sun is quite shallow, and hence reflectors must incline at a steep angle to be normal to sunlight. The Flying Leaf may use symmetric, high-anhedral sheets. Since the Flying Leaf sheets are nominally horizontal, a long banking maneuver may be one option. These may be efficient short-term compromises. Quadrotor Beanies will also have trouble with large inclinations since they also depend on aerodynamic lift to balance gravity. However, the Balloon Beanies are well suited to this problem, since the lift needed from the balloons is the same at any inclination.

Semi-Annual Migration

The reflectors can be moved constantly to best reflect sunlight. Unlike birds that wait for late autumn and spring before undertaking long flights, the reflectors can be drifted slowly and continuously to track the midsummer Sun daily as the seasons change over the planet. The drift speed required is miniscule, well under 1 m/s according to calculations presented in [17] for the Flying Leaf. The Quadrotor Beanies can achieve this by edgewise flight like a frisbee toy, while the Balloon Beanies can use small solar-powered rotors on the system to help maintain trim and change direction to follow the Sun.

Reversing Deployment as Needed

Unlike space-based concepts, the Glitter Belt can be deployed one at a time, brought down and individual elements can be replaced as required. Each swarm of sheets can be slowly and benignly directed to descend through the atmosphere, to touch down either on land or in water. While the rest of the vehicles may be recovered, most of the reflective sheets may not be re-usable after landing since re-rolling the sheets to compact form before landing does not appear to be economically viable.

Need, Advantages, Feasibility and Differences Relative to Prior Art

Several references below describe prior art and basic knowledge that are applied in the new use described in the present invention. Patent US 2016/0144969 A1 [Reference 19] describes a high-aspect ratio wing with vertical winglets and multiple electrically driven propellers, generally similar to the design that is used for one implementation of the tractor wing that is proposed to take the Flying Leaf to its designated altitude. This is generally similar to the NASA Solar Pathfinder and its derivatives. More recent inventions from Airbus Industries describe newer versions of high-altitude, long-endurance aircraft that bear several similarities to the PathFinder concept, but still use energy storage means to survive the night-time gliding period. Unlike all of these prior art, the present invention does not have to use stored electrical energy to sustain night-time altitude because of the lift generated by the large sheet that is deployed.

U.S. Pat. No. 4,415,133A [Reference 20] describes a solar-powered aircraft. The idea of keeping the solar panels perpendicular to the Sun by flying the aircraft at a large bank angle is considered there. In the present invention such angles may be useful for Flying Leaf sheets operated near the Polar regions. Even in this region, other implementations such as the Balloon Beanie may render bank angles unnecessary. The cost and complexity of flying complex maneuvers to reflect more light, has to be traded against the cost of manufacturing and launching more sheets. In one implementation, the first vehicles may be equipped with more sophisticated controls to maximize effectiveness, while mass production of sheets and carrier vehicles is ramping up.

U.S. Pat. No. 3,452,464 [Reference 21] describes a reflective Mylar sheet. Patent USUS20140252156A1 [Reference 22] describes a High Altitude Aircraft, Aircraft Unit and Method for Operating an Aircraft Unit, generally similar to Reference [23] in design but incorporating thin Mylar sheets for covering the structure. U.S. Pat. No. 9,475,567B1 [Reference 24] describes a double-layered balloon for the purpose of reducing gas leakage; however it does not anticipate placing a solar-powered pump to evacuate and re-use the gas from between the two layers, as is claimed in the present invention.

Technology that is relevant to the Glitter Belt architecture has been developed and presented by several researchers and inventors. References [24] and [25] describe the technology of solar sails. These promise to reduce the thickness and the areal density of the reflective sheets by orders of magnitude. Hence their future use is an obvious extension of the use of Mylar sheets presently claimed in this invention.

Reference [26] defines the International Standard Atmosphere, used in calculations for the present invention. Reference [27] describes the performance achieved with the NASA Pathfinder aircraft, which is referenced in developing the tractor wing portion of the Flying Leaf embodiment of the present invention. Unlike the Pathfinder, the Flying Leaf does not require auxiliary energy storage or other nighttime power generation means. This is due in part to the fact that the large sheet which is part of the Flying Leaf generates significant amounts of aerodynamic lift, that reduces the descent rate in night-time glide to very low values.

References [28] and [29] describe engineering aspects of aircraft that are intended for long-endurance flight in the upper atmosphere, including the use of solar-powered airplanes. These aspects are mostly included in the design of the Pathfinder and related aircraft. Again, the need for auxiliary energy storage forces these aircraft to have significantly higher wing loading than the Flying Leaf. In addition they require the carriage of concentrated loads such as fuel cells, which imposes additional requirements on the structural strength and thus the weight of these aircraft. This in turn increases the wing loading still further. By using the very large lifting surface area of the reflector sheets, the Flying Leaf and the Quadrotor Beanie, both achieve very low values of wing loading that cannot be approached by these prior endeavors.

Reference [30] presents experience from communications with a high-altitude solar-powered vehicle. This shows that remote operation of such vehicles has been studied, and is feasible. References [31], [32] and [33] discuss technical aspects of flying several aircraft or birds in close formation. Such flight has been used since the large bomber formations of World War II to increase range, while aerobatic exhibitions demonstrate extremely close formation flight even at very high speeds. Thus it is clear that formation flight in swarms, and communication with high-altitude swarms, are both solvable problems. Reference [34] describes the properties of the material used to make high-altitude balloons in the 1960s.

LIST OF REFERENCE TERMS, NUMERALS AND SYMBOLS

| | |
|---|---|
| Aspect Ratio | Ratio of the square of the span, to the planform area. |
| Planform Area | Area of lifting surface normal to plane formed by the chord and span. |
| Span | Straight-line distance from one wing tip to the other. |
| Chord | Straight-line from leading edge to trailing edge of a lifting surface. |
| Wing Loading | Total aircraft weight divided by planform area of lifting surfaces. |
| Camber | Curvature of the line equidistant from upper and lower surfaces. |
| Speed for minimum drag | Flight speed where lift balances weight, at the lowest value of drag |
| 1 | Solar photovoltaic array on the tractor wing of the Flying Leaf |
| 2 | Tractor wing of the Flying Leaf |
| 3 | Propeller and motor powered by solar array of item 1 |
| 4 | Canted fin of Flying Leaf |
| 5 | Reflective sheet of Flying Leaf |
| 6 | Leading edge and fairing of the reflective sheet (Item 5) |

| | |
|---|---|
| 7 | Trailing edge of the reflective sheet (Item 5) with control surfaces |
| 8 | Telescoping edge boom supporting Items 5 and 7 |
| 9 | Structure of Quadrotor with solar array including motors |
| 10 | Hub connecting motor, rotor and reflective sheet |
| 11 | Rotor blade with reflective upper surface |
| 12 | Hydrogen balloon package used to support Balloon Beanie |
| 13 | Reflective sheet of Balloon Beanie |
| 14 | Inflated peripheral structure of Balloon Beanie |
| 15 | Rotor used to control Balloon Beanie |
| 16 | Central support balloon with telemetry and flight controls |

SPECIFIC EXAMPLES, MAJOR COMPONENTS AND ALTERNATIVES

Example 1: Flying Leaf

Referring to FIG. 1, the Flying Leaf embodiment of the Glitter Belt is shown with one sheet deployed from its carrier vehicle. On a clear summer morning, the vehicle is launched from the ground, typically by placing it on a ground vehicle that accelerates along a runway or a road in an open field. The sheet is rolled up into a horizontal boom that is held between the vertical fins of the aircraft for launch.

A solar photovoltaic array (1) is located on the tractor wing (2). Electric power from the photovoltaic array powers the motors that operate the propellers attached to them. The canted vertical fins serve as horizontal and vertical tails with control surfaces, and telescoping booms (8) that deploy, extending rearward once the vehicle reaches the appropriate altitude. The sheet leading edge fairing (5) serves as a shield for the rolled-up sheet at takeoff, and then as the front support for the deployed sheet. Electric motors drive the telescoping booms (8), extending the sheet that is attached to the trailing edge (7). The trailing edge is equipped with control surface that serve as horizontal tails, elevators and ailerons during the ascent, and in subsequent flight. The sheet (6) assumes a slightly cambered form when lift acts on it. When 10 such vehicle-sheet combinations are deployed, they are brought into formation and the edges of the sheets are attached one to the next, to form a sheet 600 meters in span by 30 meters chord. The attachment mechanisms are not shown. Seven of the ten vehicles are then detached from the sheets and returned to glide back to recovery by the launch vehicles on the ground, to be used to launch the next set of sheets. The other 3 remain with the 10 sheets, providing the propulsion for the sheets to maintain lift. It is noted that it is not essential to perform either the rendezvous into formation, nor the detachment and return of several tractor vehicles. These are optional features added to improve the efficiency in flight, reduce the system weight, and save on the cost of deployment.

Control surfaces on the wing and on the canted fins, provide aerodynamic control when driven by motors that are also powered by solar electric power. In one implementation the wings will operate by radio control. In another, they will operate autonomously, with communications underway with ground stations.

As indicated above, while the reflector sheet easily supports its own weight with very small lift coefficient, the aspect ratio of each sheet is quite low, and hence the lift induced drag component is large. This drag is minimized by joining several elements together in flight to create a large aspect ratio, and by staggering elements in flight as long-distance birds such as Canadian geese do. Unlike birds, there is no flapping wing motion involved in this case, so it is feasible to position wingtips of 10 adjacent sheets contiguously to achieve a high effective aspect ratio, under automatic control. One embodiment is to connect adjacent edge booms using self-locking connectors, and then release the edge booms from the canted fins. An alternative is to connect sheets directly to one another, release from the edge boom and then tighten the connection. A third alternative is to release the sheet from the boom and allow it to automatically settle into contact with a neighboring sheet and then link the overlapping sheets to one another.

Assuming that the sheets are connected by one or some combination of the above alternatives, the basic aerodynamic component of the Flying Leaf in deployed formation becomes one of 600 m span by 30 m chord. The upwash effects of V-formation flight can then be achieved by positioning several (perhaps 25) such components in a closely spaced, shallow V formation. The primary parameter for this solution is the areal density that can be achieved for the reflector sheet without tearing due to aerodynamic loads. Hence avoiding wind fluctuations and self-excited oscillations is of paramount importance.

Successful designs can be closed even with 2-mil (50-micron) Mylar sheets, but going to strengthened versions of solar sails which offer much lower areal density, would offer strong advantages for the system when scaled up in numbers to the system size that will be needed to make rapid changes to the Global Warming rate.

In later implementations, active cambering of the sheet structure can ensure that the area aft of the nominal transition line is at a condition of incipient flow separation. This condition ensures that skin friction close to zero, downstream of the nominal transition line. This feature can be designed into the system with conventional feedback-controlled mechanical actuators.

For international standard atmospheric conditions at 30480 meters (100,000 feet) altitude, Reference [17] gives calculation results for the above embodiment. This yields a speed for minimum drag of less than 4 meters per second. The drift speed northwards or southwards, required to keep up with the latitude of peak summer, is on the order of 1 to 2 meters per second. The guidance and navigation system of the Flying Leaf swarms can be used to set the required directions and maneuvers. It is noted that the daily movement of the Flying Leaf need not be along a straight line. The optimal trajectory may be to fly at a combination of bank angle and sideslip that reflects the most sunlight, as each day progresses. Most of the deviation from initial position during the day can be recovered during the gliding flight at night, along with the northward or southward drift before the sun comes up the next day.

Example 2: Quadrotor Beanie

Referring to FIG. 3, the Quadrotor Beanie will start under solar power on a clear day and ascend to the desired altitude using its own rotor power. An alternative is to use a larger hydrogen balloon to accelerate the ascent. After the ascent the balloon may be returned to Earth. The cruciform structure (9) holds the four rotor motor pods and solar cells (not shown in FIG. 3). Once at altitude the rotors (11) provide enough power to keep the vehicle flying, with the sheets (10) reflecting sunlight. It is understood that several versions of this concept are possible, at different scales. The best will be developed through analysis and testing and is likely to have a much larger reflector area for each set of 4 rotors.

In one embodiment one or more electrical storage batteries will be mounted near the blade tip of each rotor. These will enhance night-time energy availability both from stored electrical energy, and from stored mechanical energy due to the higher rotational moment of inertia. Detailed studies will decide the merits of such an arrangement against the additional cost, structural and battery weight, and increased hazards.

Similarly to the control methods used for quad-rotor vehicles, by adjusting the rotational speed of each rotor, various maneuvers are performed under automatic control.

The motion of the Quadrotor-Beanie could be combined with slow edgewise flight similar to that of a helicopter or gyroplane in autorotation in order to further enhance night-time energy storage and maneuvering ability.

A nominal 50 m diameter rotor as conceived for the initial embodiment, has 15 to 24 blades and a hub extending to 50% of the radius: these choices may be varied to suit the particular design constraints of a given implementation.

Example 3: Balloon Beanie

Referring to FIG. 4, the Balloon Beanie, aerostatically supported reflector sheet concept, is shown with 6 balloons. The balloons (11) are deployed from the ground, and they lift the central sheet (10) to the desired altitude. The inflated rim (9) holds the sheet steady and carries solar cells, while small rotors (12) driven by solar power provide control and steering power. The arrangement of the balloons can be varied depending on the desired sheet shape and orientation.

Solar-powered rotors around the periphery provide trim, counter winds, and allow the twice-a-year migration. Some energy storage may be added to provide emergency power at night. The issue of hydrogen leakage is addressed with a double-shell provided with an evacuation pump in between. The shell structure can be made with present materials, but future implementations may offer opportunities to use advanced ultralight materials such as Silica AeroGel. The reflective coated Mylar membrane of the balloons reduces the tilt needed to reflect evening, morning and polar summer sun. The size of the inner hydrogen-inflated shell can vary, constrained by the dimensions of the outer shell, so that the risk of bursting when exposed to direct sunlight is alleviated.

Various configurations are anticipated for the Balloon Beanie. The configuration shown in FIG. 4 is simplified for explanation. Other implementations may use different configurations and shapes of the balloons or integrate them with the sheets in different ways depending on the nature of the deployed mission, and the expected trajectory of the Sun through the azimuth.

Further Discussion on Improvements Over Prior Art

Hershkovitz [35] anticipates a method of reflecting sunlight using inflated panels filled with lighter-than-air gas and towed by an aerial vehicle in the atmosphere. He has not taught regarding the volume and weight needed for his invention, or the thrust energy needed to tow such panels, at a speed where an aerial vehicle can remain airborne. Airplanes towing a banner are well-known. When applied to a thin horizontal sheet, towing results in the phenomenon of flag instability, where the sheet develops large wave-like oscillations. This fluctuating load results in a drag increase of up to a factor of 8. The frame or other structure needed to counter such loads, adds to the weight. An inflated structure is an example of such a frame; inflated structures lose inflation over time. If a separate aerial vehicle is used to tow such panels, the flight speed must be high enough for the aerial vehicle to generate enough lift to support its own weight. The drag per unit panel area of a large inflated structure, at such speed, will be large. The power required to tow such panels, requires a high rate of expenditure of fuel, making it impractical to fly continuously through a period of several months. Usage of fossil fuel contributes to Global Warming. Further, Hershkovitz did not teach any method to generate lift using the sheet to contribute to the lift of the towing aircraft. Thus the present invention which teaches how to use aerodynamic lift generated by a thin sheet, while avoiding flag instability, is an improvement over the prior art in the specific instance of Hershkovitz's invention, as a method to reduce solar radiation in order to alleviate Global Warming.

Kavai [13] taught tilting of ground-based reflectors through the course of a day and through seasonal changes. Ground-based reflectors reflect at best 50% of incoming sunlight back into Space, usually less. In winter the sun's rays are slanted more and must travel further through the atmosphere. This further reduces the percentage of sunlight that is reflected into Space. Until the present invention, there were no practical means of continuously transporting reflectors to the changing latitude where the season is summer. Since most ground-based reflectors are located at sub-optimal locations, much more ground reflector area is required to achieve the same effect as the present invention. The present invention is the first to present a valid means of transporting reflectors to follow the summer sun.

While different aspects of the present invention have been used in different prior devices, the integration of these into a single system has not been achieved before.

CONCLUSIONS

As described above, the Glitter Belt invention presents a low-cost, scalable and reversible method and apparatus which can be deployed rapidly to start reducing the rate at which the Earth's atmosphere is rising in temperature. It does so by reducing the solar irradiance to the atmosphere. It is anticipated that initial deployment tests using full-scale or small-scale models will establish the performance and effects of the invention, permitting rapid scaling up. It is understood that millions of reflectors will be needed to significantly reduce the rate of atmospheric heat retention. However, by proper prioritization of the sequence, high impact can be obtained quickly with concepts such as the Polar Necklace, and the summer-following sheet swarms. As system deployment proceeds, the design and mass production features of the architecture will be refined to maximize the payoffs and reduce the costs. It is also anticipated that the reflector sheet systems may be combined with other uses, thereby improving their economic viability.

The Glitter Belt invention proves that at least one near-term solution exists, for the problem of Global Climate Change. It is possible to extend the system to the level that is required to reverse atmospheric heating back to desired levels. Such a large change will require hundreds of millions of reflectors of the size described herein, to be deployed, over a period of 1 or two decades, with the participation of many nations around the world. Unlike prior concepts, the Glitter Belt is not known to cause any adverse effects. All the deployed systems may be removed from high altitude and the material recovered on demand. These aspects may be verified by actual testing which can proceed during the initial phase before significant expenditure of time or financial resources. In these respects and others, the Glitter Belt invention provides advantages superior to those of any prior proposals.

REFERENCES

[1] Stocker, T. F. et al, (2013). Climate Change 2013: The Physical Science Basis. IPCC Working Group WG1 Contribution to The Assessment Report AR5 of the Intergovernmental Panel on Climate Change. Cambridge University Press. 1552p

[2] Early, J. T., "Space-Based Solar Shield To Offset Greenhouse Effect", Journal of the British Interplanetary Society, 42, pp. 567-569, 1989.

[3] Palti, Y., "Outer Space Sun Screen For Reducing Global Warming". Patent Application US 20080203328 A1, Aug. 28, 2008.

[4] Crutzen, P. J., Albedo enhancement by stratospheric sulfur injections: a contribution to resolve a policy dilemma? Climatic change. Springer, 77, 3, p. 211-220, 2006.

[5] Cody, C. A., "Method and devices to Control Global Warming". US Patent Application 20080203329 A1, Aug. 28, 2008.

[6] Chang, D. B., Shih, I. Fu, "Stratospheric Welsbach seeding for reduction of global warming". U.S. Pat. No. 5,003,186 A, Mar. 26, 1991.

[7] Neff, R., "Atmospheric injection of reflective aerosol for mitigating Global Warming". Patent Application US 20100127224 A1, Sep. 30, 2008.

[8] Jones, C. D., P. M. Cox, R. L. H. Essery, D. L. Roberts, and M. J. Woodage, Strong carbon cycle feedbacks in a climate model with interactive CO2 and sulphate aerosols, Geophysics Research Letters, 30, 1479, 2003.

[9] Eisenberger, P. and Chichilnisky, G., System and Method for Removing Carbon Dioxide From an Atmosphere and Global Thermostat Using the Same. U.S. Pat. No. 9,555, 365B2, 2017-01-31.

[10] Teller, E., Hyde, R., Wood, L. Global Warming and Ice Ages: Prospects for Physics-Based Modulation of Global Change, 22nd International Seminar on Planetary Emergencies Erice (Sicily), Italy, August 1997. Also, Lawrence Livermore National Laboratory, UCRL-JC-128715, 1997.

[11] Frieler, K., Mengel, M., & Levermann, A. (2016). Delaying future sea-level rise by storing water in Antarctica. Earth System Dynamics, 7(1), 203.

[12] Grimm, R., Notz, D., Glud, R. N., Rysgaard, S., Six, K. D. Assessment of the sea-ice carbon pump: Insights from a three-dimensional ocean-sea-ice-biogeochemical model (MPIOM/HAMOCC). Elementa, 4, U.California Press, 2016.

[13] Kawai, K., "Solar Energy Reflection Plate For Suppressing Global Warming". US Patent Application US 20110013271 A1, Jan. 20, 2011.

[14] Akbari, H., Menon, S., & Rosenfeld, A. (2009). Global cooling: increasing world-wide urban albedos to offset CO 2. Climatic Change, 94(3), 275-286.

[15] Menon, S., Akbari, H., Mahanama, S., Sednev, I., & Levinson, R. (2010). Radiative forcing and temperature response to changes in urban albedos and associated CO2 offsets. Environmental Research Letters, 5(1), 014005.

[16] Scambos, T. A., Hulbe, C., Fahnestock, M., & Bohlander, J. (2000). The link between climate warming and break-up of ice shelves in the Antarctic Peninsula. Journal of Glaciology, 46(154), 516-530.

[17] Komerath, N., Hariharan, S., Shukla, D., Patel, S., Rajendran, V., and Hale, E., "The Flying Carpet: Aerodynamic High-Altitude Solar Reflector Design Study," Tech. rep., SAE Technical Paper, Sep. 30, 2017.

[18] Shukla, D., Hariharan, S., Patel, S., Hiremath, N., Komerath, N., Tradeoff Study of High Altitude Reflector Concepts. SAE AeroTech Conference, Ft. Worth, Tex., Sep. 30, 2017.

[19] Rawdon, B. K., Kutzmann, A. J., US Patent Application 20160144969 A1, May 26, 2016.

[20] Phillipps, W. H., "Solar Powered Aircraft". U.S. Pat. No. 4,415,133A, Nov. 15, 1983.

[21] Meyer, R., "Reflective Sheet". U.S. Pat. No. 3,452,464, September 1967.

[22] Hiebl, M., Pongratz, H. W., "High Altitude Aircraft, Aircraft Unit and Method for Operating an Aircraft Unit". Patent US20140252156A1 Sep. 11, 2014.

[23] Roach, K., "Double Layered Balloon Envelope." U.S. Pat. No. 9,475,567B1, Oct. 25, 2016.

[24] Lockett, Tiffany Russell, Alexander Few, and Richard Wilson. "Near Earth Asteroid Solar Sail Engineering Development Unit Test Program." 2017.

[25] Wright, J. L. "Space sailing." Taylor & Francis; 1992.

[26] Atmosphere, US Standard. "NOAA-S/T76-1562." Washington, D.C.: US Government Printing Office (1976).

[27] Flittie, K., & Curtin, B. (1998, August). Pathfinder solar-powered aircraft flight performance. In 23rd Atmospheric Flight Mechanics Conference (p. 4446).

[28] Romeo, G., Frulla, G., Cestino, E., & Corsino, G. (2004). HELIPLAT: design, aerodynamic, structural analysis of long-endurance solar-powered stratospheric platform. Journal of Aircraft, 41(6), 1505-1520.

[29] André, N. O. T. H. "Design of solar powered airplanes for continuous flight." PhD diss., ETH Zürich, 2008.

[30] Miura, R., Maruyama, M., Suzuki, M., Tsuji, H., Oodo, M., & Nishi, Y., Experiment of telecom/broadcasting mission using a high-altitude solar-powered aerial vehicle Pathfinder Plus. In Wireless Personal Multimedia Communications, 2002. IEEE 5th International Symposium, Vol. 2, pp. 469-473. October 2002.

[31] Lissaman, P. B. S., & Shollenberger, C. A. (1970). Formation flight of birds. Science, 168(3934), 1003-1005.

[32] Hummel, D. (1983). Aerodynamic aspects of formation flight in birds. Journal of theoretical biology, 104(3), 321-347.

[33] Blake, W., & Multhopp, D. (1998, August). Design, performance and modeling considerations for close formation flight. In 23rd Atmospheric Flight Mechanics Conference (p. 4343).

[34] Staugaitis, C. L., & Kobren, L. (1966). Mechanical And Physical Properties Of The Echo II Metal-Polymer Laminate (No. NASA-TN-D-3409). National Aeronautics And Space Administration Goddard Space Flight Center.

[35] Hershkovitz, Bruno. 'Device and Method for Affecting Local Climatic Parameters'. U.S. Pat. No. 7,726,601 B2, Jun. 1, 2010.

The invention claimed is:
1. Method of deploying a sheet of material in the atmosphere, comprising:

a. launching a powered aerodynamic vehicle holding a sheet in rolled-up form by means of a ground vehicle;
b. transporting said sheet in rolled form from Earth's surface, using fins of an aerodynamic vehicle to hold said sheet in rolled-up form during launch and ascent;
c. deploying telescoping rods from fins, causing extension and stretching of said sheet;
d. controlling angle of attack of said aerodynamic vehicle in flight by control surface means attached to edge of said sheet;
e. generating aerodynamic lift from said sheet by adjusting and maintaining angle of attack of sheet relative to air flow using said control surface means;
f. minimizing altitude loss during glide by using aerodynamic lift of said sheet and said aerodynamic vehicle at a suitable flight speed.

* * * * *